(12) United States Patent
Takahashi et al.

(10) Patent No.: US 9,216,730 B2
(45) Date of Patent: Dec. 22, 2015

(54) VEHICLE

(71) Applicants: Yoshimitsu Takahashi, Toyota (JP);
Keisuke Morisaki, Toyota (JP); Daisuke Itoyama, Toyota (JP); Hideaki Yaguchi, Toyota (JP); Shinichi Sugai, Toyota (JP)

(72) Inventors: Yoshimitsu Takahashi, Toyota (JP);
Keisuke Morisaki, Toyota (JP); Daisuke Itoyama, Toyota (JP); Hideaki Yaguchi, Toyota (JP); Shinichi Sugai, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 44 days.

(21) Appl. No.: 14/008,984

(22) PCT Filed: Oct. 12, 2012

(86) PCT No.: PCT/JP2012/076487
§ 371 (c)(1),
(2) Date: Sep. 30, 2013

(87) PCT Pub. No.: WO2014/057579
PCT Pub. Date: Apr. 17, 2014

(65) Prior Publication Data
US 2014/0107878 A1    Apr. 17, 2014

(51) Int. Cl.
| | |
|---|---|
| *G01M 15/11* | (2006.01) |
| *G01M 15/04* | (2006.01) |
| *B60W 20/00* | (2006.01) |
| *B60W 10/06* | (2006.01) |
| *B60W 10/08* | (2006.01) |
| *B60K 6/445* | (2007.10) |
| *B60W 30/20* | (2006.01) |

(52) U.S. Cl.
CPC .............. *B60W 20/00* (2013.01); *B60W 10/06* (2013.01); *B60W 10/08* (2013.01); *B60W 20/40* (2013.01); *G01M 15/04* (2013.01); *G01M 15/11* (2013.01); *B60K 6/445* (2013.01); *B60W 2030/206* (2013.01); *B60W 2510/0638* (2013.01); *B60W 2710/0633* (2013.01); *B60W 2710/0644* (2013.01); *Y02T 10/6239* (2013.01); *Y02T 10/6286* (2013.01); *Y10S 903/903* (2013.01)

(58) Field of Classification Search
CPC ..... B60W 20/00; B60W 20/40; B60W 10/08; B60W 10/06
USPC ............................................ 701/22; 903/903
See application file for complete search history.

(56) References Cited

U.S. PATENT DOCUMENTS

| | | | | |
|---|---|---|---|---|
| 4,763,264 | A | * | 8/1988 | Okuno et al. .................. 123/399 |
| 2010/0114460 | A1 | * | 5/2010 | Akimoto ....................... 701/111 |

(Continued)

FOREIGN PATENT DOCUMENTS

| | | |
|---|---|---|
| CN | 102189991 A | 9/2011 |
| DE | 10 2010 034 554 A1 | 3/2011 |

(Continued)

OTHER PUBLICATIONS

International Search Report Issued Jan. 15, 2013 in PCT/JP12/076487 Filed Oct. 12, 2012.

*Primary Examiner* — Nga X Nguyen
(74) *Attorney, Agent, or Firm* — Oblon, McClelland, Maier & Neustadt, L.L.P.

(57) ABSTRACT

An ECU is mounted on a vehicle including an engine and a motor that can generate cranking torque applied to a rotation shaft of the engine. Where a request for starting the engine is not issued, the ECU determines whether the engine is during coasting or not. The ECU changes cranking target torque in accordance with engine rotation speed. In this way, engine rotation speed during cranking can be reduced to and remain in the optimum region where misfire and resonance can be avoided.

6 Claims, 8 Drawing Sheets

(56) References Cited

U.S. PATENT DOCUMENTS

2011/0054765 A1 3/2011 Lewis et al.
2011/0224851 A1* 9/2011 Jacques et al. .................. 701/22
2011/0251747 A1* 10/2011 Imai et al. ....................... 701/22

FOREIGN PATENT DOCUMENTS

| | | |
|---|---|---|
| DE | 10 2011 005 469 A1 | 9/2012 |
| JP | 2004 92623 | 3/2004 |
| JP | 2009 221926 | 10/2009 |

* cited by examiner

VEHICLE

TECHNICAL FIELD

The present invention relates to a vehicle with an engine.

BACKGROUND ART

Japanese Patent Laying-Open No. 2004-92623 (PTD 1) discloses that restarting of an engine is permitted when a throttle position is smaller than a predetermined value in a state where the engine is stopped during running of the vehicle, and restarting of the engine is permitted after the throttle position has been forcibly reduced to the predetermined value. This prevents occurrence of sudden acceleration due to an abrupt increase in driving force at the time of restarting of the engine, while permitting restarting of the engine during running of the vehicle.

CITATION LIST

Patent Document

PTD 1: Japanese Patent Laying-Open No. 2004-92623

SUMMARY OF INVENTION

Technical Problem

However, the engine may not be properly restarted if the engine is restarted in a state where the throttle position is small (the amount of intake air is small) during coasting of the engine (while the engine is rotating through inertia), as in PTD 1. For example, even if restarting of the engine is attempted by injecting fuel from an injector during rotation of the engine at high speed, in the state where the amount of intake air is small as in PTD 1, the amount of the fuel becomes excessively large with respect to the amount of intake air, which may cause misfire.

As a measure for this, the amount of fuel injected from the injector may be reduced. However, even if the amount of injected fuel is reduced to a minimal value, occurrence of misfire cannot be avoided if the amount of the fuel is still excessively large with respect to the amount of intake air. As another possible measure, the amount of intake air may be increased. With this measure, however, an abrupt increase in driving force at the time of restarting of the engine (the problem solved in PTD 1) cannot be avoided.

The present invention was made to solve the above-described problem, and an object of the invention is to maintain the engine rotation speed within a rotation region where misfire can be avoided without increasing the amount of intake air, at the time of starting the engine during coasting.

Solution to Problem

A vehicle according to this invention includes an engine, a motor that can generate cranking torque applied to a rotation shaft of the engine, and a control device that controls the motor so that the cranking torque becomes a target torque when a starting request of the engine is issued. The control device changes the target torque in accordance with a rotation speed of the engine when the starting request is issued during coasting of the engine.

Preferably, the control device sets the target torque when the rotation speed is higher than a threshold speed to be a value lower than the target torque when the rotation speed is lower than the threshold speed. The threshold speed is a value corresponding to a lower limit value of a rotation region where misfire of the engine occurs in a state where an amount of intake air to the engine is smaller than a predetermined amount.

Preferably, the control device sets the target torque when the rotation speed is higher than the threshold speed to be a value that decreases as the rotation speed increases.

Preferably, the target torque is set to a value at which the rotation speed can be reduced to a rotation region where misfire of the engine can be avoided in a state where the amount of intake air to the engine is smaller than the predetermined amount.

Preferably, the target torque is set to a value at which the rotation speed can be reduced to the rotation region where misfire of the engine can be avoided, and at which the rotation speed can be maintained in a rotation region where resonance of the vehicle can be avoided.

Preferably, the control device changes the target torque in accordance with the rotation speed when the starting request is issued during coasting of the engine in the state where the amount of intake air to the engine is smaller than the predetermined amount.

Preferably, the control device changes the cranking torque based on the rotation speed when the starting request is issued during processing to stop the engine while the vehicle is running.

Preferably, the control device changes the cranking torque based on the rotation speed when the starting request is issued during coasting of the engine in a state where an amount of operation of an accelerator pedal by a user is smaller than a predetermined amount.

Preferably, the control device sets the target torque to a value that does not vary in accordance with the rotation speed when the starting request is issued while the engine is not rotating.

Advantageous Effects of Invention

In accordance with the present invention, the rotation speed of the engine can be maintained in a rotation region where misfire can be avoided without increasing the amount of intake air, at the time of starting the engine during coasting.

DESCRIPTION OF EMBODIMENTS

Embodiments of the present invention will be described hereinafter, with reference to the drawings. In the following description, the same components are denoted by the same symbols. The names and functions thereof are also the same. Detailed description thereof, therefore, will not be repeated.

Figure 1:
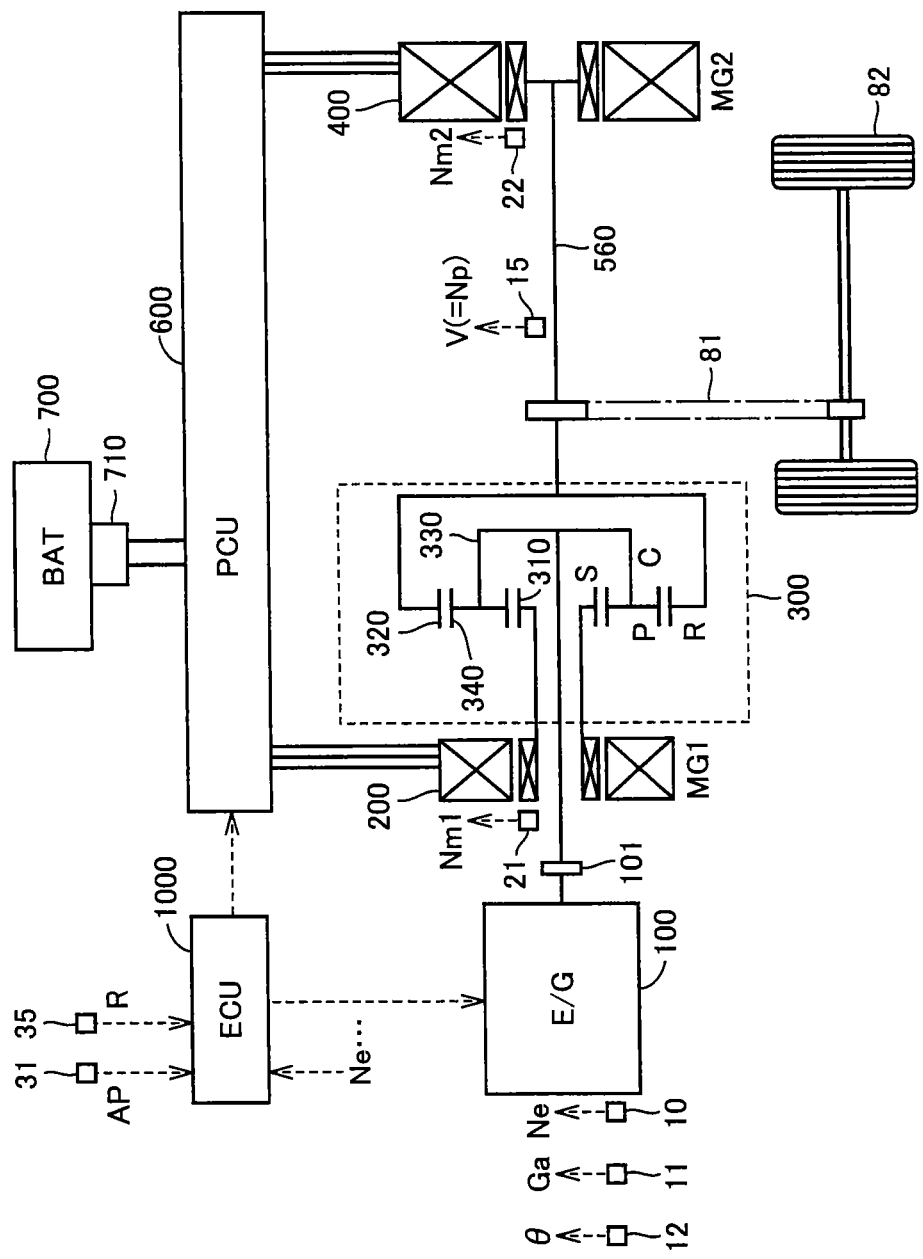
FIG. 1 is an overall block diagram of a vehicle.

FIG. 1 is an overall block diagram of a vehicle 1 according to this embodiment. Vehicle 1 includes a drive device that generates vehicle driving force, and an ECU (Electronic Control Unit) 1000 that controls a plurality of devices of vehicle 1, including the drive device.

The drive device of vehicle 1 includes an engine 100, a first MG (MG: Motor Generator) 200, a power split device 300, a second MG 400, a propeller shaft (output shaft) 560, a PCU (Power Control Unit) 600, a battery 700, and an SMR (System Main Relay) 710.

Vehicle 1 is a hybrid vehicle that runs with driving force output from at least one of engine 100 and second 2MG 400. The vehicle to which the present invention can be applied is not limited to a hybrid vehicle, and may also be, for example, a vehicle using the engine only as a driving source.

Engine 100 is an internal combustion engine that outputs motive power by combustion of fuel. The motive power of engine 100 is transmitted to power split device 300 via a damping mechanism 101. Damping mechanism 101 absorbs and reduces variations in rotation transmitted to power split device 300 from engine 100.

Power split device 300 splits the motive power input from engine 100 into motive power to output shaft 560 and motive power to first MG 200.

Power split device 300 is a planetary gear mechanism having a sun gear (S) 310, a ring gear (R) 320, pinion gears (P) 340 meshing with sun gear (S) 310 and ring gear (R) 320, and a carrier (C) 330 rotatably holding pinion gears (P) 340 such that the pinion gears are also rotatable around the sun gear. Carrier (C) 330 is connected to a crankshaft of engine 100. Sun gear (S) 310 is connected to a rotor of first MG 200. Ring gear (R) 320 is connected to output shaft 560.

With the structure of power split device 300 as described above, a rotation speed of sun gear (S) 310 (=first MG rotation speed Nm1), a rotation speed of carrier (C) 330 (=engine rotation speed Ne), and a rotation speed of ring gear (R) 320 (=second MG rotation speed Nm2, i.e., vehicle speed V) have a relation such that they are connected by straight lines on the nomographic charts of power split device 300 (see FIGS. 2 and 3 described below), that is, a relation such that if any two of the rotation speeds are determined, the remaining rotation speed is also determined.

Each of first MG 200 and second MG 400 is an AC rotating electric machine, and also serves as a motor and a generator. A rotor of second MG 400 is connected to output shaft 560. As will be described below, at the time of starting engine 100, first MG 200 generates torque (hereinafter referred to as "cranking torque TC") applied to a rotation shaft (crankshaft) of engine 100 to crank engine 100.

Output shaft 560 is rotated by at least any of the motive power of engine 100 transmitted via power split device 300, and motive power of second MG 400. The rotating force of output shaft 560 is transmitted to left and right driving wheels 82 via a reduction gear 81. This causes vehicle 1 to run.

PCU 600 converts high-voltage DC electric power supplied from a battery 700 to AC electric power, for output to first MG 200 and/or second MG 400. This causes first MG 200 and/or second MG 400 to be driven. PCU 600 also converts AC electric power generated by first MG 200 and/or second MG 400 to DC electric power, for output to battery 700. This causes battery 700 to be charged.

Battery 700 is a secondary battery that stores high-voltage (approximately 200 V, for example) DC electric power for driving first MG 200 and/or second MG 400. Battery 700 typically includes a nickel metal hydride battery or a lithium ion battery. Vehicle 1 may also have mounted thereon a system allowing battery 700 to be charged with electric power from a power supply outside vehicle 1.

SMR 710 is a relay for switching a connection state between battery 700 and the electrical system including PCU 600.

Vehicle 1 further includes an engine rotation speed sensor 10, an air flow meter 11, a throttle position sensor 12, an output shaft rotation speed sensor 15, resolvers 21, 22, and an accelerator position sensor 31. Engine rotation speed sensor 10 detects engine rotation speed Ne. Air flow meter 11 detects an amount of intake air Ga (an amount of air drawn into engine 100). Throttle position sensor 12 detects a throttle position θ (an amount of actuation of a throttle valve). Output shaft rotation speed sensor 15 detects rotation speed Np of output shaft 560 as vehicle speed V. Resolvers 21 and 22 detect first MG rotation speed Nm1 and second MG rotation speed Nm2, respectively. Accelerator position sensor 31 detects an amount of operation AP of an accelerator pedal by a user. Each of these sensors outputs the detection result to ECU 1000.

Vehicle 1 also includes a start switch 35. Start switch 35 is a switch for a user to request switching of a control state of the control system (hereinafter referred to simply as the "vehicle system") of vehicle 1, including the drive device. When the user presses start switch 35, start switch 35 outputs a signal R indicating the pressing of start switch 35 to ECU 1000.

ECU 1000 incorporates a not-shown CPU (Central Processing Unit) and a memory, and executes predetermined operation processing based on information stored in the memory and information from the various sensors. ECU 1000 controls the vehicle system based on results of the operation processing.

ECU 1000 switches the control state to any of an activated state (hereinafter referred to as the "Ready-ON state") and a stopped state (hereinafter referred to as the "Ready-OFF state"), based on signal R from start switch 35.

When the user has pressed start switch 35 in the Ready-ON state (hereinafter referred to as the "Ready-OFF request operation"), ECU 1000 causes engine 100 to stop by stopping the fuel injection to engine 100 (hereinafter referred to as the "engine stop processing"), and switches the control state of the vehicle system to the Ready-OFF state. Engine 100, first MG 200, and second MG 400 are stopped in the Ready-OFF state, so that even if the user operates the accelerator pedal, driving force is not generated from the drive device.

When the user has pressed start switch 35 in the Ready-OFF state (hereinafter referred to as the "Ready-ON request operation"), ECU 1000 cranks engine 100 to start engine 100 (hereinafter referred to as the "engine start processing"), and switches the control state of the vehicle system to the Ready-ON state after completing the engine start processing. In the Ready-ON state, operation of engine 100, first MG 200, and second MG 400 is permitted, and driving force is generated from the drive device in accordance with the operation of the accelerator pedal by the user.

Figure 2:
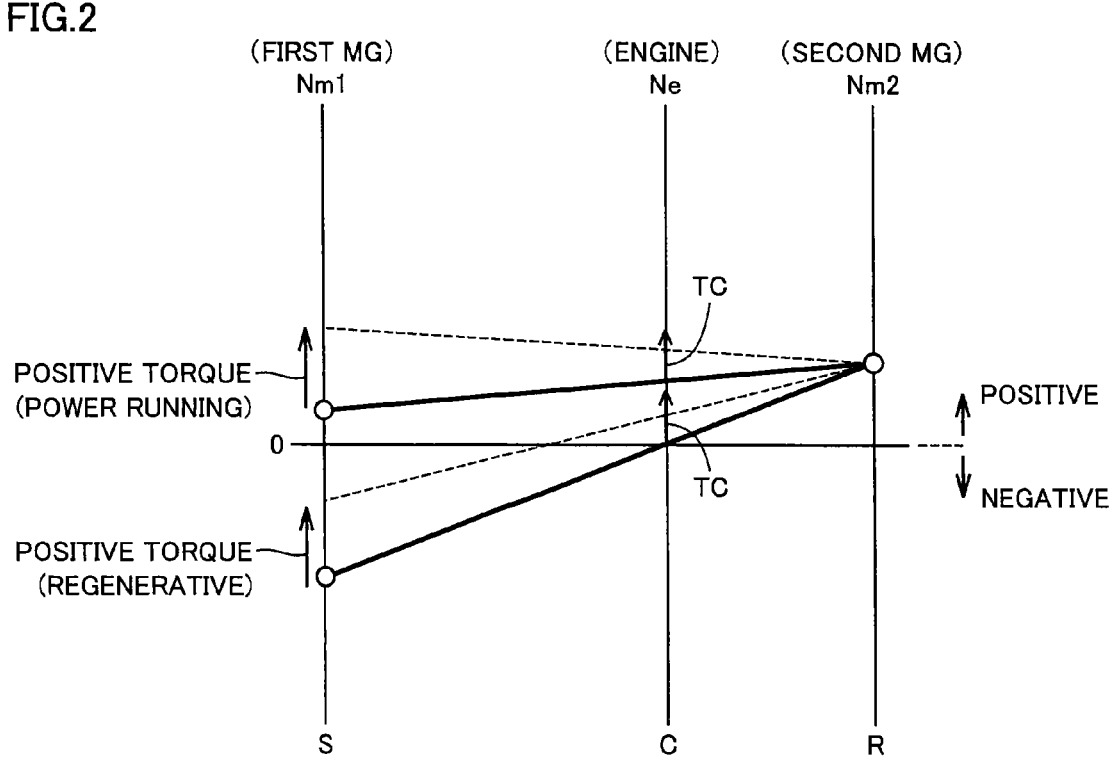
FIG. 2 is a nomographic chart showing a case where the engine is cranked while the vehicle is running in a forward direction.

FIG. 2 shows a nomographic chart of the case where engine 100 is cranked while the vehicle is running in a forward direction. As shown in FIG. 2, ECU 1000 generates torque in a positive direction from first MG 200, thereby applying cranking torque TC in the positive direction to the crankshaft of engine 100. Here, when first MG rotation speed Nm1 is a positive value, ECU 1000 controls first MG 200 in a power running state, thereby generating torque in the positive direction from first MG 200. Conversely, when first MG rotation speed Nm1 is a negative value, ECU 1000 controls first MG 200 in a regenerative state, thereby generating torque in the positive direction from first MG 200.

Once engine rotation speed Ne is included in a predetermined rotation speed region due to cranking torque TC, ECU 1000 performs control such that a fuel injection device injects fuel to engine 100 and an ignition device ignites the injected fuel. This places the combustion of fuel in a complete state (namely, complete explosion is attained), thus completing the engine start processing.

In vehicle 1 having the structure as described above, there are various cases where a request for starting the engine is issued during the engine stop processing (when the fuel injection is stopped but engine 100 is still coasting). For example, as described above, when the Ready-OFF request operation is done while the vehicle is running, the engine stop processing is started. When the Ready-ON request operation is done during the engine stop processing, the request for starting the engine is issued. Moreover, the request for starting the engine may also be issued when, for some reason, the user stops stepping on the accelerator pedal and requires the engine brake while the engine stop processing is being performed.

ECU 1000 according to this embodiment applies cranking torque TC to engine 100 not only when the request for starting the engine is issued while the engine is stopped (when engine 100 is not rotating), but also when the request for starting the engine is issued during the engine stop processing (when engine 100 is coasting).

However, if engine rotation speed Ne is high at the time of restarting engine 100 during the engine stop processing, there is a possibility that misfire may occur and engine 100 cannot be restarted. That is, in a region where engine rotation speed Ne is high, if the amount of intake air is small, the amount of injected fuel becomes excessively large with respect to the amount of intake air, causing misfire without combustion of the fuel. Thus, there is a possibility that engine 100 cannot be restarted in a region where engine rotation speed Ne is high.

Figure 3:
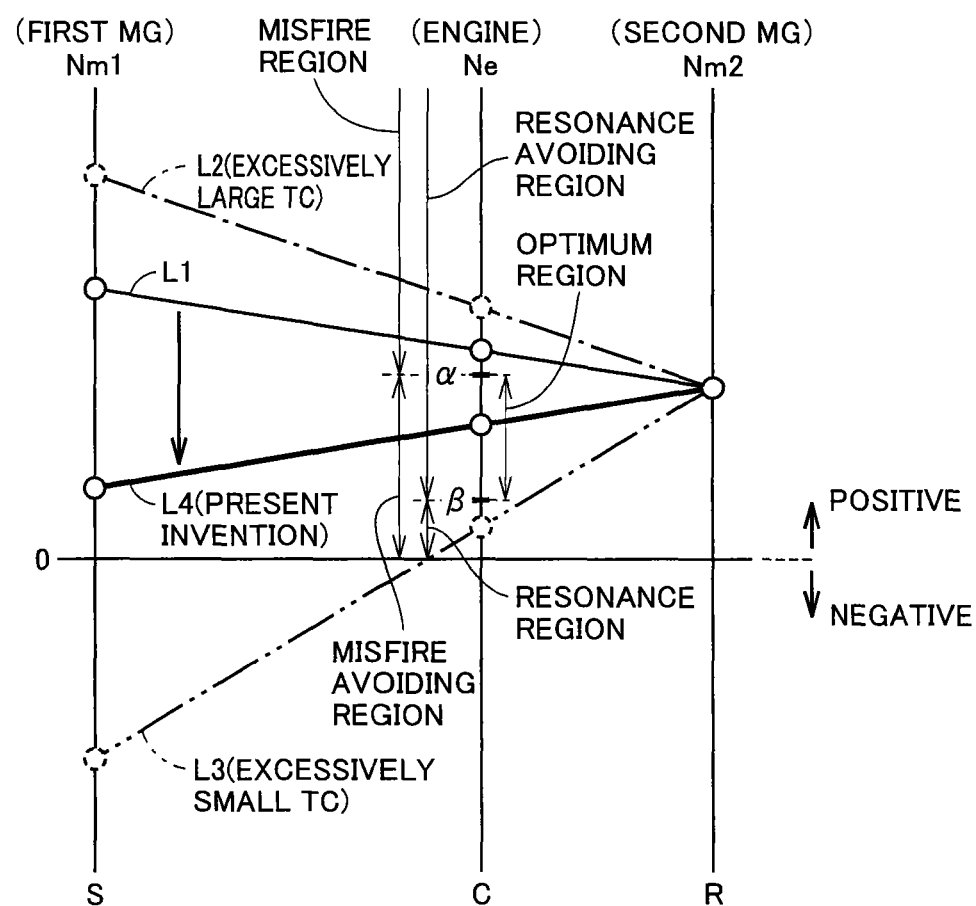
FIG. 3 is a nomographic chart showing a case where the engine is cranked during engine stop processing.

FIG. 3 shows a nomographic chart of the case where engine 100 is cranked during the engine stop processing.

In FIG. 3, "α" is a value corresponding to an engine rotation speed αt which misfire of engine 100 starts to occur in a state where amount of intake air Ga is smaller than the predetermined amount. This value "α" will hereinafter be referred to as "threshold speed α", an engine rotation region higher than threshold speed α referred to as the "misfire region", and an engine rotation region lower than threshold speed α referred to as the "misfire avoiding region". Threshold speed α is a value corresponding to a lower limit value of the misfire region. In this embodiment, threshold speed α is found in advance through experiments or the like, assuming a case where amount of intake air Ga is a minimal value (case where the throttle valve is fully closed).

In FIG. 3, "β" (β<α) is a value corresponding to an upper limit value of an engine rotation region where resonance of damping mechanism 101 may occur. This value "β" will hereinafter be referred to as "threshold speed β", an engine rotation region lower than threshold value β referred to as the "resonance region", and an engine rotation region higher than threshold speed β referred to as the "resonance avoiding region". Moreover, an engine rotation region higher than threshold value μ and lower than threshold value α will be referred to as the "optimum region".

As shown in FIG. 3, it is assumed that the engine stop processing is started in a state indicated by collinear line L1 (a state where engine rotation speed Ne is over threshold speed α). In this case, as the fuel injection is stopped, engine rotation speed Ne gradually decreases to zero. When the request for starting the engine is issued during such coasting of the engine, cranking torque TC is applied.

If cranking torque TC is excessively large, engine rotation speed Ne increases more than before cranking and enters the misfire region, as indicated by collinear line L2. Thus, there is a possibility that complete explosion of engine 100 may not be attained.

On the other hand, if cranking torque TC is excessively small, engine rotation speed Ne decreases too much and remains in the resonance region, as indicated by collinear line L3, which may cause generation of vibration or noise.

Therefore, in ECU 1000 according to this embodiment, when the request for starting the engine is issued during the engine stop processing (during coasting of the engine), a target value of cranking torque TC (hereinafter referred to as "cranking target torque TCtag") is changed to an appropriate value in accordance with engine rotation speed Ne, so that engine rotation speed Ne during cranking is reduced to and remains in the optimum region, as indicated by collinear line L4.

As another method of avoiding misfire, the amount of injected fuel may be reduced. However, the minimal value of injected fuel is physically determined by the specifications of the fuel injection device (the shortest time during which the fuel injector nozzle can be opened and closed), and therefore, misfire cannot be avoided when the amount of fuel is still excessively large even if the amount of injected fuel is reduced to a limit, namely, a minimal value. Moreover, if just the avoidance of misfire is desired, amount of intake air Ga may be increased. If amount of intake air Ga is increased, however, the driving force increases abruptly at the time of restarting of the engine, causing sudden acceleration of the vehicle. This feeling of acceleration can often be undesirable to a user who wishes to drive the vehicle stably after restarting the engine, or to a user who wishes to cause the engine brake to operate. Thus, it is not preferred to increase amount of intake air Ga when restarting the engine during the engine stop processing. In view of the above, ECU 1000 according to this embodiment changes cranking target torque TCtag to an appropriate value in accordance with engine rotation speed Ne, so that engine rotation speed Ne during cranking is reduced to and remains in the optimum region, without increasing amount of intake air Ga.

Figure 4:
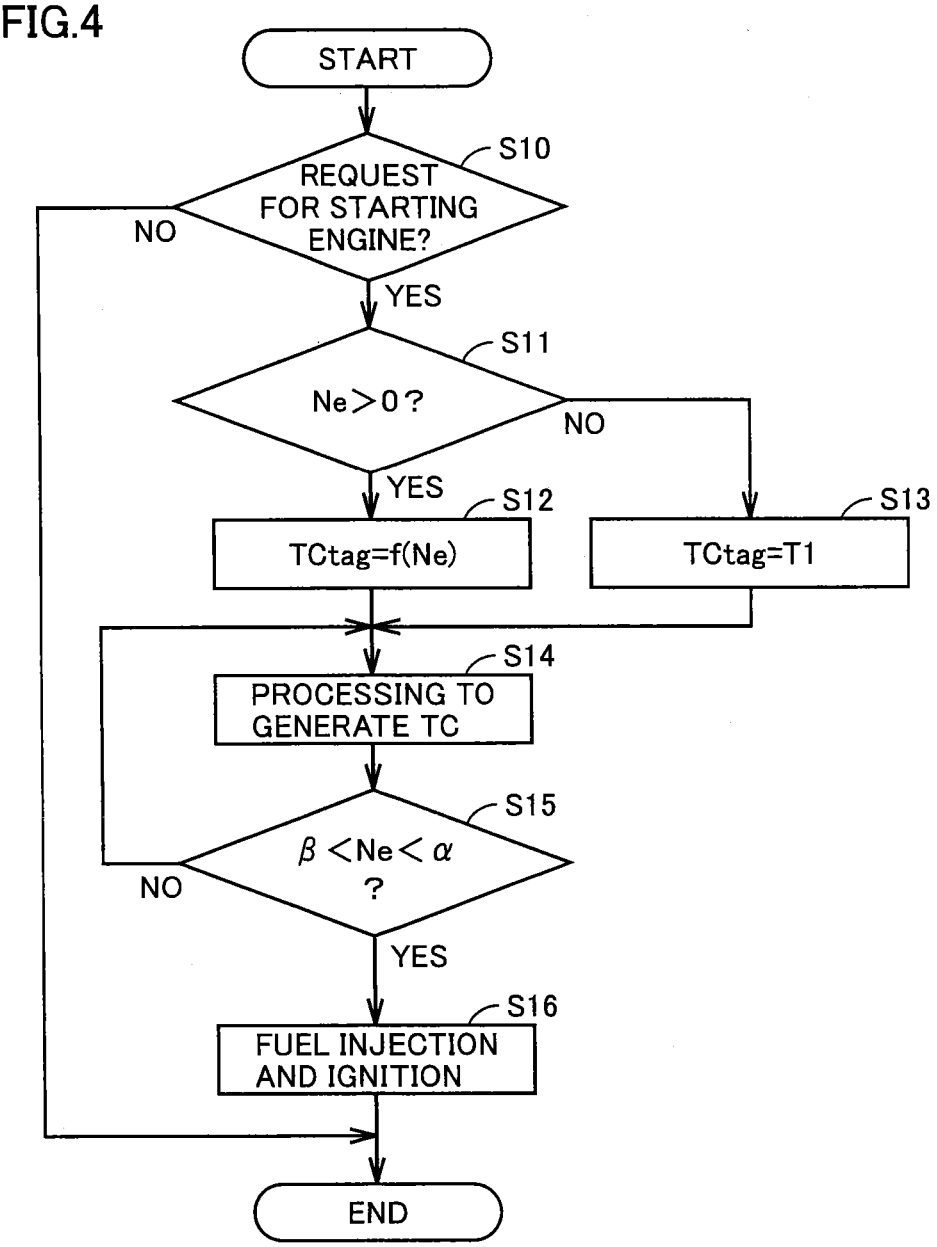
FIG. 4 is a (first) flow chart showing a processing procedure executed by an ECU.

FIG. 4 is a flow chart showing a processing procedure executed by ECU 1000. The procedure in this flow chart is repeatedly executed in a predetermined cycle.

In Step ("Step" is hereinafter abbreviated to "S") 10, ECU 1000 determines whether the request for starting the engine has been issued or not. Where the request for starting the engine has not been issued (NO in S10), ECU 1000 completes the processing.

Where the request for starting the engine has been issued (YES in S10), ECU 1000 moves the processing to S11, where it determines whether engine rotation speed Ne is greater than zero or not. This processing is for determining whether the engine is coasting or not during the engine stop processing.

Where engine rotation speed Ne is zero (NO in S11), that is, engine 100 is not rotating, ECU 1000 moves the processing to S13, where it sets cranking target torque TCtag to a predetermined value T1. This processing corresponds to a case where cranking target torque TCtag is set using a conventional technique. This embodiment describes an exemplary case where predetermined value T1 is a fixed value that does not vary in accordance with engine rotation speed Ne.

On the other hand, where engine rotation speed Ne is greater than zero (YES in S11), that is, the engine is coasting during the engine stop processing, ECU 1000 moves the processing to S12, where it changes cranking target torque TCtag in accordance with engine rotation speed Ne. In other words, ECU 1000 sets cranking target torque TCtag to the function f(Ne) having engine rotation speed Ne as a parameter.

Figure 5:
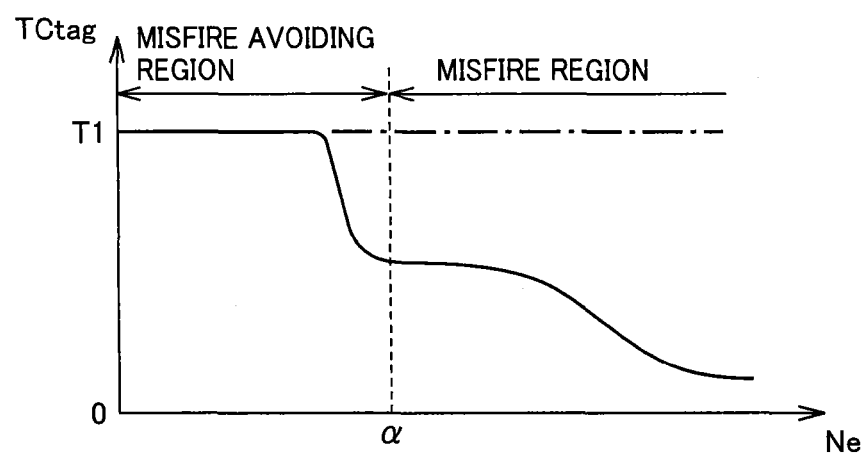
FIG. 5 is a diagram showing a correlation between cranking target torque TCtag and engine rotation speed Ne.

FIG. 5 is a diagram showing a correlation between cranking target torque TCtag and engine rotation speed Ne, which is set by the processing in S12.

As shown in FIG. 5, cranking target torque TCtag in the misfire region (engine rotation region higher than threshold speed α) is set to a value lower than cranking target torque TCtag in the misfire avoiding region (engine rotation region lower than threshold speed α).

Cranking target torque TCtag in the misfire region is set to a value that decreases as engine rotation speed Ne increases. On the other hand, cranking target torque TCtag in the misfire avoiding region is set to predetermined value T1, which is the same as the value where Ne=0, in a rotation region near zero. In a rotation region close to threshold speed α, cranking target torque TCtag gradually decreases below predetermined value T1 as it approaches threshold speed α.

Cranking target torque TCtag shown in FIG. 5 is set to a value at which engine rotation speed Ne can be reduced to the misfire avoiding region (engine rotation region lower than threshold speed α) and can be maintained in the resonance avoiding region (engine rotation region higher than threshold speed β).

In this way, a suitable cranking torque TC having a good balance with engine friction in the optimum region (engine rotation region lower than threshold speed α and higher than threshold speed β) can be applied to engine 100. For example, where engine rotation speed Ne before cranking is higher than threshold speed α, cranking torque TC can be reduced in accordance with engine rotation speed Ne, so that engine rotation speed Ne during cranking is reduced to the optimum region at an early time and remains in the optimum region. This allows engine 100 to be properly started while avoiding misfire and resonance.

Turning back to FIG. 4, ECU 1000 performs processing to generate cranking torque TC in S14. Specifically, ECU 1000 controls first MG 200 so that actual cranking torque TC becomes cranking target torque TCtag set in S12 or S13.

In S15, ECU 1000 determines whether engine rotation speed Ne is included in the optimal region (engine rotation region lower than threshold speed α and higher than threshold speed β) or not. Where engine rotation speed Ne is not included in the optimum region (NO in S15), ECU 1000 returns the processing to S14.

Where engine rotation speed Ne is included in the optimum region (YES in S15), ECU 1000 moves the processing to S16, where it performs control such that fuel is injected to engine 100 for ignition. This completes the engine start processing.

Figure 6:
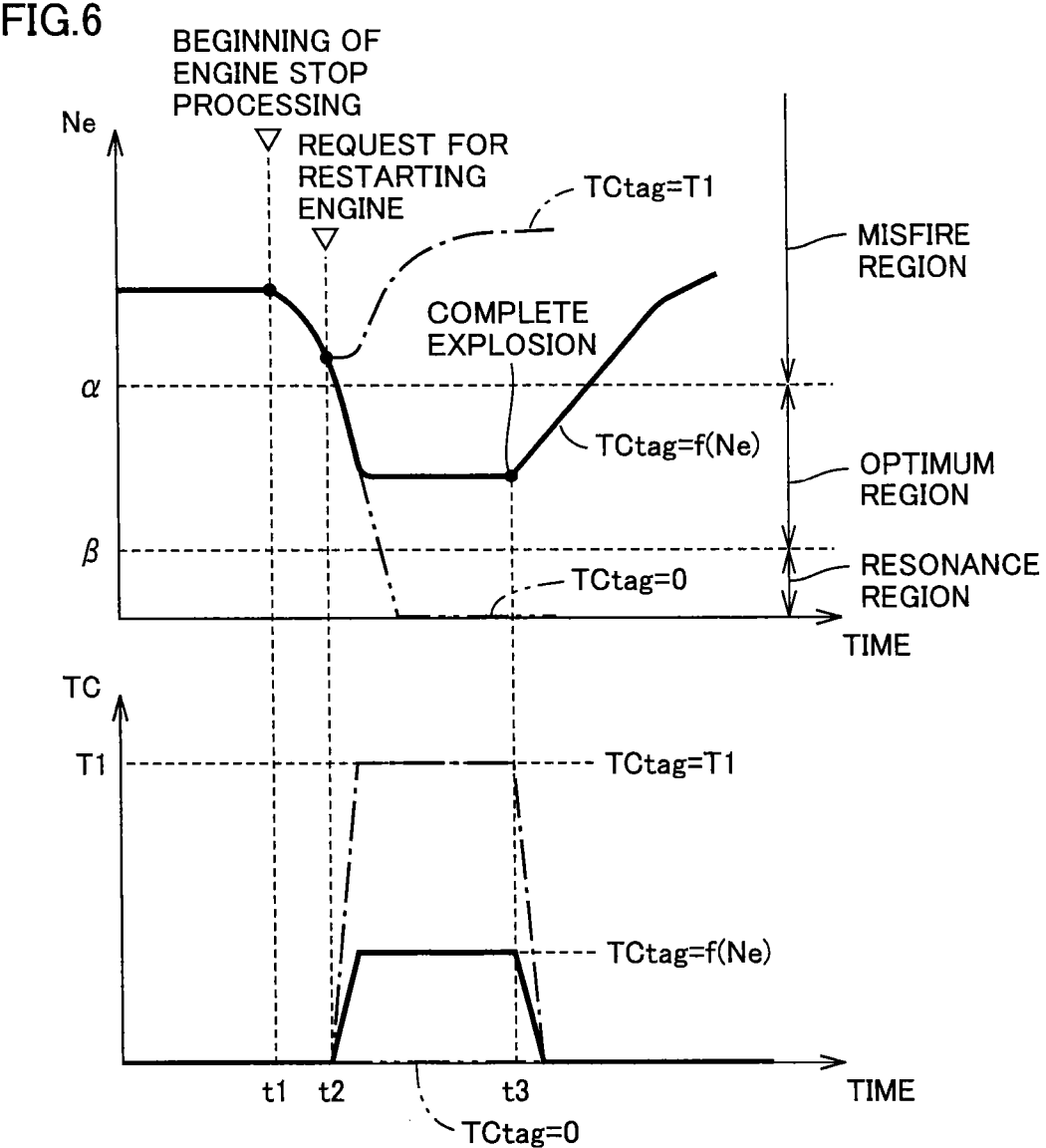
FIG. 6 is a timing chart of engine rotation speed Ne and cranking torque TC.

FIG. 6 is a timing chart of engine rotation speed Ne and cranking torque TC where the request for starting the engine is issued during the engine stop processing.

If the engine stop processing is started at time t1 when vehicle 1 is running in a state where engine rotation speed Ne is higher than threshold speed α, engine rotation speed Ne gradually decreases toward zero.

If the request for starting the engine is issued at time t2 when engine 100 is coasting, cranking target torque TCtag is set to an optimum value in accordance with engine rotation speed Ne (see FIG. 5 described above). Actual cranking torque TC is then controlled to be cranking target torque TCtag. This causes engine rotation speed Ne to decrease to the optimum region from the misfire region. Since cranking torque TC and engine friction torque are balanced with each other in the optimum region, engine rotation speed Ne remains in the optimum region without decreasing to the resonance region. Then at time T3 when engine rotation speed Ne remains in the optimum region, fuel is injected to engine 100 and ignited, causing engine 100 to be properly started (complete explosion) while avoiding misfire and resonance.

Conventionally, it has not been contemplated that the engine is started in a state where the engine is coasting in an engine rotation region higher than threshold speed α. Hence, as indicated by the dashed-dotted line in FIG. 6, for example, there are some cases where even though the engine is coasting, predetermined value T1 which is the same as the value when the engine is not rotating is set as cranking target torque TCtag. In this case, cranking torque TC becomes excessively large, and engine rotation speed Ne during cranking enters the misfire region, which may cause misfire. Alternatively, as indicated by the dashed two-dotted line in FIG. 6, for example, there are other cases where cranking torque TC is not generated in the first place (TCtag=0) when starting the engine during coasting of the engine. In this case, engine rotation speed Ne decreases too much and enters the resonance region, which may cause generation of vibration or noise at the time of starting of the engine. In this embodiment, the engine can be properly started without causing these problems.

As described above, when the request for starting the engine is issued during coasting of the engine, ECU 1000 according to this embodiment changes cranking target torque TCtag in accordance with engine rotation speed Ne. Thus, even when the engine is started in a state where engine rotation speed Ne is high and amount of intake air Ga is small, engine rotation speed Ne during cranking can advantageously be reduced to and remain in the rotation region where misfire can be avoided, without increasing amount of intake air Ga.

First Modification

In the flow chart shown in FIG. 4 described above, where the request for starting the engine has been issued (YES in S10) and engine rotation speed Ne is greater than zero (YES in S11), cranking target torque TCtag is changed in accordance with engine rotation speed Ne (S12).

As opposed to this, at least any of the following additional conditions 1 to 3 may be added as appropriate, as a condition for changing cranking target torque TCtag in accordance with engine rotation speed Ne.

(Additional Condition 1) The engine stop processing is being performed while the vehicle is running.

(Additional Condition 2) Amount of intake air Ga is smaller than a predetermined amount G0.

(Additional Condition 3) Amount of operation AP of the accelerator pedal is smaller than a predetermined amount A0.

Figure 7:
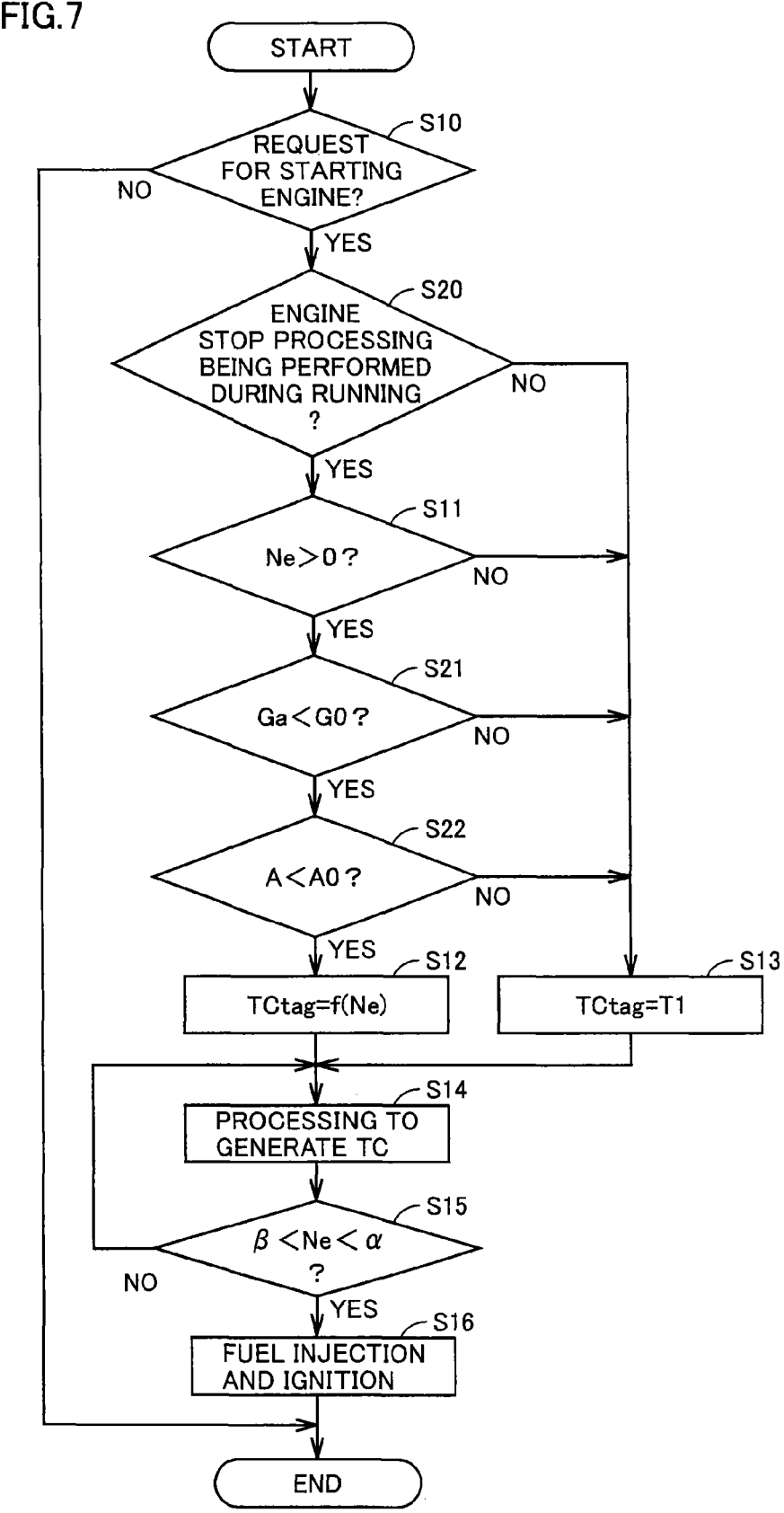
FIG. 7 is a (second) flow chart showing a processing procedure executed by the ECU.

FIG. 7 is a flow chart showing one example of a processing procedure executed by ECU 1000 according to a first modification. In the flow chart shown in FIG. 7, the processing in S20, S21, and S22 corresponding to the above-listed additional conditions 1 to 3, respectively has been added to the flow chart shown in FIG. 4 described above.

That is, ECU 1000 changes cranking target torque TCtag in accordance with engine rotation speed Ne where the request for starting the engine is issued (YES in S10), the engine stop processing is being performed while the vehicle is running (YES in S20), engine rotation speed Ne is greater than zero (YES in S11), amount of intake air Ga is smaller than predetermined amount G0 (YES in S21), and amount of operation AP of the accelerator pedal is smaller than predetermined amount A0 (YES in S22). If not so (NO in any of S10, S11 and S20 to S22), ECU 1000 moves the processing to S13, where it sets cranking target torque TCtag to predetermined value T1.

In this way, cranking target torque TCtag can be changed in accordance with engine rotation speed Ne only when the possibility of misfire is high.

Second Modification

Figure 8:
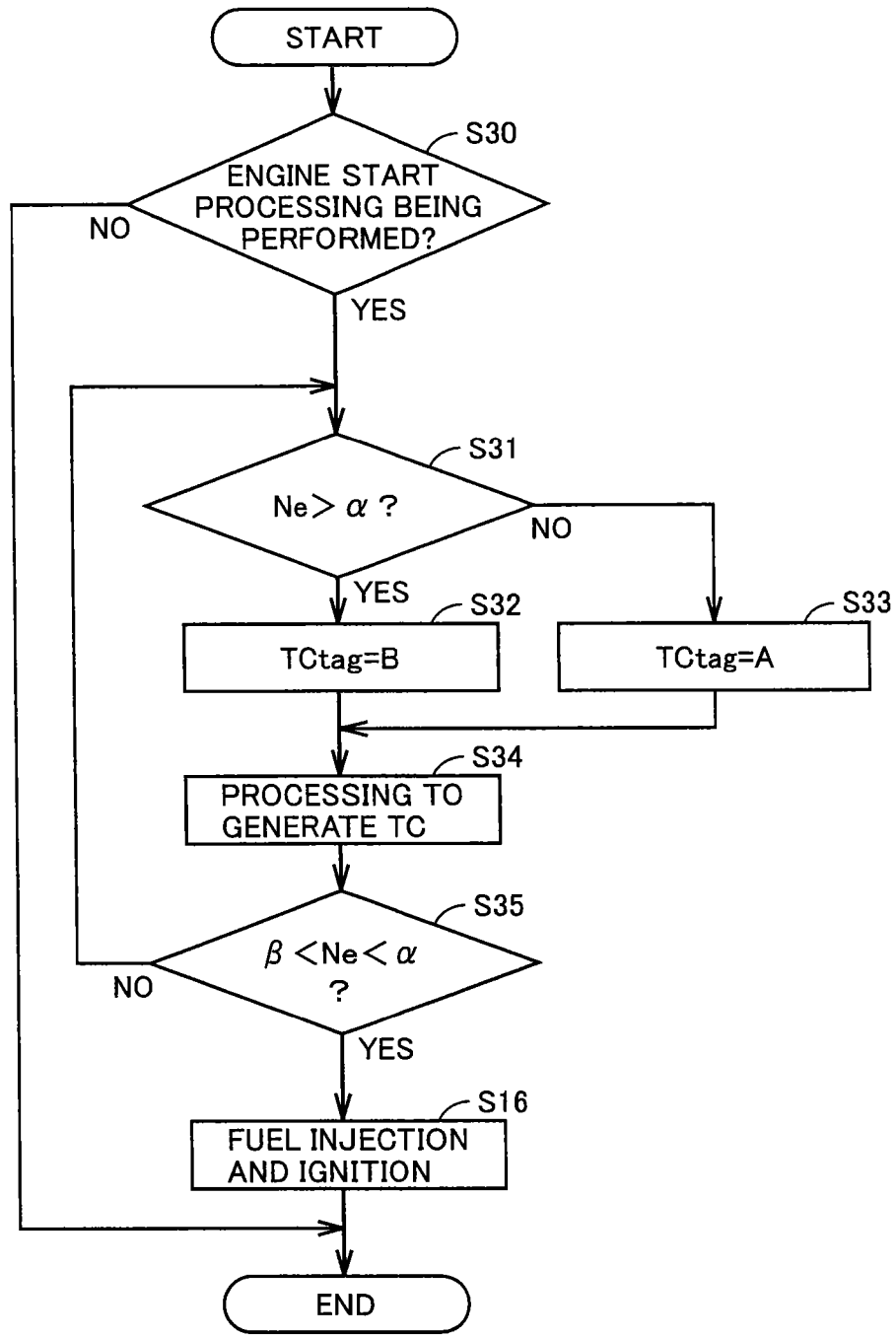
FIG. 8 is a (third) flow chart showing a processing procedure executed by the ECU.

FIG. 8 is a flow chart showing one example of a processing procedure executed by ECU 1000 according to a second modification. Note that those steps shown in FIG. 8 denoted by the same numbers as the numbers of the above-described steps in FIG. 4 have already been described, and thus, detailed description thereof will not be repeated herein.

ECU 1000 determines in S30 whether the engine start processing is being performed or not. Where the request for starting the engine has been issued, or complete explosion of engine 100 has not been attained yet after the request for starting the engine, ECU 1000 determines that the engine start processing is being performed. Where the engine start processing is not being performed (NO in S30), ECU 1000 completes the processing.

On the other hand, when the engine start processing is being performed (YES in S30), ECU 1000 moves the processing to S31, where it determines whether engine rotation speed Ne is greater than threshold speed α described above or not. This processing is for determining whether engine rotation speed Ne is included in the above-described misfire region or not.

Where engine rotation speed Ne is smaller than threshold speed α (NO in S31), ECU 1000 moves the processing to S33, where it sets cranking target torque TCtag to a predetermined value A. This processing corresponds to a case where cranking target torque TCtag is set using a conventional technique. For example, predetermined value A is set to a value similar to cranking target torque TCtag in the misfire avoiding region shown in FIG. 5 described above.

Where engine rotation speed Ne is greater than threshold speed α (YES in S31), ECU 1000 moves the processing to S32, where it sets cranking target torque TCtag to a predetermined value B. Predetermined value B herein is a value that varies in accordance with engine rotation speed Ne and is smaller than predetermined value A set in S33. For example, predetermined value B is set to a value similar to cranking target torque TCtag in the misfire region shown in FIG. 5 described above.

In S34, ECU 1000 controls first MG 200 so that actual cranking torque TC becomes cranking target torque TCtag set in S32 or S33.

In S35, ECU 1000 determines whether engine rotation speed Ne is included in the optimum region (engine rotation region lower than threshold speed α and higher than threshold speed β) or not.

Where engine rotation speed Ne is not included in the optimum region (NO in S35), ECU 1000 returns the processing to S31, and repeats the processing of S31 to S34.

Where engine rotation speed Ne is included in the optimum region (YES in S35), ECU 1000 moves the processing to S16, where it performs control such that fuel is injected to engine 100 for ignition. This completes the engine start processing.

In this way also, engine rotation speed Ne during cranking can be advantageously reduced to and remain in the rotation region where misfire can be avoided, without increasing amount of intake air Ga, as in the first embodiment.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1: vehicle; 10: engine rotation speed sensor; 11: air flow meter; 12: throttle position sensor; 15: output shaft rotation speed sensor; 21, 22: resolver; 31: accelerator position sensor; 35: start switch; 81: reduction gear; 82: driving wheel; 100: engine; 101: damping mechanism; 200: first MG; 300: power split device; 400: second MG; 560: output shaft; 600: PCU; 700: battery; 1000: ECU.

The invention claimed is:

1. A vehicle comprising:
an engine;
motor that can generate cranking torque applied to a rotation shaft of said engine; and
a control device that controls said motor so that said cranking torque becomes a target torque when a starting request of said engine is issued;
when said starting request is issued during coasting of said engine in which combustion does not occur, said control device changing said target torque such that a corresponding value of a rotation speed of the engine is changed from being higher than a predetermined threshold speed to being lower than said predetermined threshold speed and such that misfire of said engine is avoided,
said predetermined threshold speed being a value corresponding to a lower limit value of a rotation region where misfire of said engine occurs in a state where an amount of intake air to said engine is smaller than a predetermined amount
wherein said predetermined threshold speed is a value corresponding to the lower limit value of the rotation region where misfire of said engine occurs in a state where an amount of intake air to said engine is a minimal amount.

2. The vehicle according to claim 1, wherein
said control device sets said target torque when said rotation speed is higher than said predetermined threshold speed to be a value that decreases as said rotation speed increases.

3. The vehicle according to any one of claims 1 to 2, wherein said target torque is set to a value at which said rotation speed is reduced to said rotation region where misfire of said engine is avoided, and at which said rotation speed is maintained in a rotation region where resonance of said vehicle is avoided.

4. The vehicle according to claim 3, wherein
said control device changes said target torque in accordance with said rotation speed when said starting request is issued during coasting of said engine in a state where an amount of intake air to said engine is smaller than a predetermined amount.

5. The vehicle according to claim 3, wherein
said control device changes said target torque based on said rotation speed when said starting request is issued during processing to stop said engine while said vehicle is running.

6. The vehicle according to claim 3, wherein
said control device sets said target torque to a value that does not vary in accordance with said rotation speed when said starting request is issued while said engine is not rotating.

* * * * *